(12) United States Patent
Yamamoto et al.

(10) Patent No.: US 9,077,088 B2
(45) Date of Patent: Jul. 7, 2015

(54) CONNECTING STRUCTURE AND CONNECTING METHOD OF FIBER CONDUCTOR WIRE

(75) Inventors: Toshihiko Yamamoto, Makinohara (JP); Yutaka Terasaka, Makinohara (JP); Hideto Kumakura, Makinohara (JP)

(73) Assignee: Yazaki Corporation, Tokyo (JP)

( * ) Notice: Subject to any disclaimer, the term of this patent is extended or adjusted under 35 U.S.C. 154(b) by 153 days.

(21) Appl. No.: 13/819,501

(22) PCT Filed: Sep. 15, 2011

(86) PCT No.: PCT/JP2011/071759
§ 371 (c)(1),
(2), (4) Date: Feb. 27, 2013

(87) PCT Pub. No.: WO2012/039487
PCT Pub. Date: Mar. 29, 2012

(65) Prior Publication Data
US 2013/0180778 A1 Jul. 18, 2013

(30) Foreign Application Priority Data

Sep. 21, 2010 (JP) ................................. 2010-210434

(51) Int. Cl.
*H01R 4/00* (2006.01)
*H01R 9/03* (2006.01)
(Continued)

(52) U.S. Cl.
CPC ............. *H01R 9/03* (2013.01); *Y10T 29/49174* (2015.01); *H01R 4/5041* (2013.01);
(Continued)

(58) Field of Classification Search
CPC ....................................................... H01R 4/00

USPC ...... 174/74 R, 255, 263, 268, 75 R, 77 R, 82, 174/84 C; 439/441, 888, 874, 877
See application file for complete search history.

(56) References Cited

U.S. PATENT DOCUMENTS

| 1,751,386 A | * | 3/1930 | Belden ........................... 439/502 |
| 2,759,041 A | * | 8/1956 | Cox ............................ 174/121 R |

(Continued)

FOREIGN PATENT DOCUMENTS

| GB | 25407 | 12/1900 |
| GB | 134 633 A | 11/1919 |

(Continued)

OTHER PUBLICATIONS

Extended European Search Report dated Jul. 17, 2014 issued for PCT/JP2011-071759.
(Continued)

*Primary Examiner* — William H Mayo, III
(74) *Attorney, Agent, or Firm* — Locke Lord LLP; James E. Armstrong, IV; Brian S. Matross

(57) ABSTRACT

A fiber conductor wire structure includes a fiber conductor and a terminal. The fiber conductor has a first portion with an outer insulating resin and a second portion with an outer conductive metal. The second portion defines a knot. The terminal has a hole for inserting the fiber conductor. The hole has a receiving portion configured to receive the knot in locked engagement and electrical connection with the terminal. A connecting method for the fiber conductor wire includes forming a knot with a portion of a fiber conductor having an outer conductive metal, inserting the fiber conductor into a hole of a terminal, and pulling the fiber conductor through the hole to engage the knot with a receiving portion of the terminal to place the knot in locked engagement and electrical connection with the terminal.

12 Claims, 3 Drawing Sheets

(51) Int. Cl.
  *H01R 4/50* (2006.01)
  *H01R 13/58* (2006.01)
  *H02G 15/02* (2006.01)
  *H01R 43/00* (2006.01)
  *H01R 4/58* (2006.01)
  *F16G 11/10* (2006.01)
  *H01R 43/28* (2006.01)

(52) U.S. Cl.
  CPC .......... *H01R 13/5833* (2013.01); *H02G 15/02* (2013.01); *H01R 43/00* (2013.01); *H01R 4/58* (2013.01); *H01R 43/28* (2013.01); *F16G 11/103* (2013.01)

(56) References Cited

U.S. PATENT DOCUMENTS

| | | | |
|---|---|---|---|
| 2,977,403 A | | 3/1961 | Reitz |
| 3,249,909 A | | 5/1966 | Kowalewski |
| 3,264,017 A | * | 8/1966 | Lagarde .......... 403/302 |
| 3,941,915 A | * | 3/1976 | Boghosian .......... 174/555 |
| 4,081,659 A | * | 3/1978 | Kemp .......... 392/467 |
| 4,117,449 A | * | 9/1978 | McNeel .......... 367/188 |
| 4,140,412 A | * | 2/1979 | Vitt .......... 403/28 |
| 4,337,923 A | * | 7/1982 | Smith .......... 254/134.3 FT |
| 4,438,292 A | * | 3/1984 | Woodall .......... 174/549 |
| 2005/0079751 A1 | | 4/2005 | Decker |

FOREIGN PATENT DOCUMENTS

| | | |
|---|---|---|
| GB | 1 406 016 A | 9/1975 |
| JP | 08-050934 A | 2/1996 |
| JP | 08-336345 A | 12/1996 |
| JP | 09-288912 A | 11/1997 |
| JP | 2010-108662 A | 5/2010 |
| JP | 4528955 B1 | 8/2010 |

OTHER PUBLICATIONS

Notification of Reason for Refusal mailed May 27, 2014, issued for the Japanese patent application No. 2010-210434 and English translation thereof.

Notification of Grounds for Rejection dated May 16, 2014, issued for the Korean patent application No. 10-2013-7003283 and English translation thereof.

International Search Report dated Nov. 1, 2011, issued for PCT/JP2011/071759.

* cited by examiner

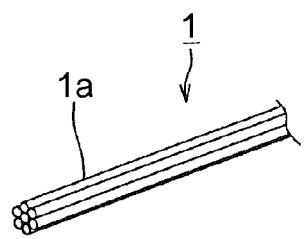
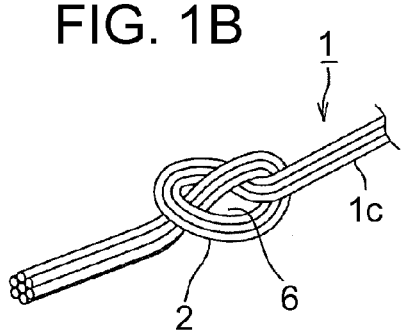
FIG. 1A
FIG. 1B
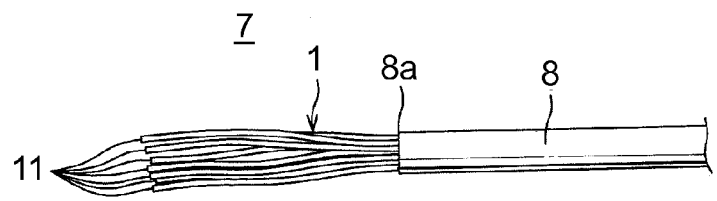
FIG. 2A
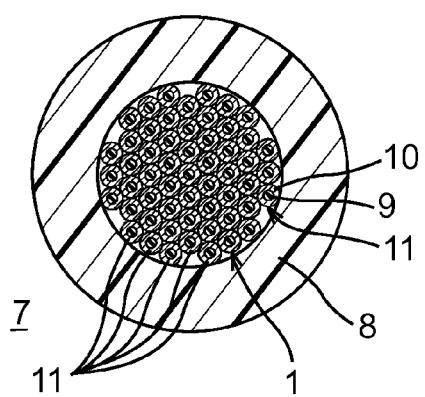
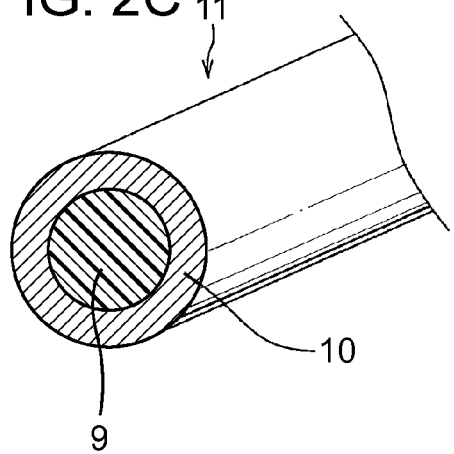
FIG. 2B
FIG. 2C

CONNECTING STRUCTURE AND CONNECTING METHOD OF FIBER CONDUCTOR WIRE

TECHNICAL FIELD

This invention relates to a connecting structure and a connecting method of a fiber conductor wire configured to connect a bendable fiber conductor to a terminal.

BACK GROUND ART

Conventionally, a conductive wire formed by bundling a plurality of element wires made of conductive metal (copper) has less flexibility and is heavy. To combat them, it is known to form a conductive wire by plating conductive metal on surfaces of a plurality of synthetic-resin-made fibers (for example, see Patent Document 1, 2).

PRIOR ART DOCUMENT

Patent document

Patent Document 1: JP, A, H09-288912
Patent Document 2: JP, A, 2010-108662

DISCLOSURE OF THE INVENTION

Problem to be Solved by the Invention

However, while the above-described fiber conductor wire has high tension strength, it has low shear strength. Therefore, it is difficult to pressure-bond using a conventional pressure bonding terminal. For example, it is necessary to connect and fix the fiber conductor wire to a pin-shaped or plate-shaped terminal by soldering or the like, while the fiber conductor wire is wound around the terminal. Therefore, there is a fear that many man-hours and devices may be necessary for connecting, and a cost may be increased.

Accordingly, in view of the above, an object of the present invention is to provide a connecting structure and a connecting method of a fiber conductor wire allowing the fiber conductor wire to be connected to a terminal easily and surely at low cost.

Means for Solving the Problem

For attaining the object of the invention, there is provided a connecting structure of a fiber conductor wire comprising:
a fiber conductor having a knot; and
a terminal having a hole for inserting the fiber conductor, said hole having a receiving portion for receiving the knot,
wherein the fiber conductor wire and the terminal are electrically connected to each other by inserting the fiber conductor into the hole and by locking the knot in the receiving portion.

According to the above, an outer wall of the fiber conductor electrically contacts an inner wall of the hole, and the bump-shaped knot of the fiber conductor is engaged with the receiving portion of the hole, thereby an outer wall of the knot electrically contacts an inner wall of the receiving portion. Thus, the fiber conductor and the terminal are electrically connected to each other. Because the knot is locked in the receiving portion, the fiber conductor is prevented from falling out of the terminal.

According to the invention, there is provided a connecting method of a fiber conductor wire comprising the steps of.
forming a not by tying loosely a fiber conductor;
inserting the fiber conductor into a hole of a terminal; and
pulling the fiber conductor to engage the knot with a receiving portion of the hole and to electrically connect the knot to the receiving portion.

According to the above, an outer wall of the fiber conductor electrically contacts an inner wall of the hole, and the bump-shaped knot of the fiber conductor is engaged with the receiving portion of the hole, thereby an outer wall of the knot electrically contacts an inner wall of the receiving portion. When the knot tied loosely is inserted into the receiving portion, an outer wall of the knot closely contacts an inner wall of the receiving portion without gap, thereby the electrical connectivity is increased. When the knot is larger than the receiving portion, by pulling the fiber conductor strongly, a diameter of the knot is reduced and the outer wall of the knot closely contacts the inner wall of the receiving portion without gap, thereby similarly the electrical connectivity is increased. Because the knot is locked in the receiving portion, the fiber conductor is prevented from falling out of the terminal.

According to the invention, there is provided a connecting method further comprising the step of.
pressing the knot received in the receiving portion via the terminal so as to closely contact the knot with the receiving portion.

According to the above, an outer wall of the knot conforms to an inner wall of the receiving portion, and a gap between the outer wall of the knot and the inner wall of the receiving portion is surely eliminated, thereby the electrical contactivity between the knot and the receiving portion is increased. At the same time, contactivity between the inner wall of the hole and the outer wall of the fiber conductor is also increased.

Effects of the Invention

According to the invention by an easy operation of tying the flexible fiber conductor and inserting it into the hole of the terminal, not depending on soldering, the fiber conductor can be easily and surely connected to the terminal at low cost.

According to the invention, by an easy operation of tying loosely the flexible fiber conductor and inserting it into the hole of the terminal, not depending on soldering, the knot can be closely attached to the receiving portion without gap, and surely electrically contact the receiving portion, thereby the fiber conductor can be easily and surely connected to the terminal at low cost.

According to the invention, the outer wall of the knot can be closely attached to the inner wall of the receiving portion, thereby reliability of electrical connection can be improved.

BRIEF DESCRIPTION OF DRAWINGS

[FIG. 1A] [FIG. 1B] Perspective views showing sequentially a process flow of an embodiment of a connecting structure and a connecting method of a fiber conductor wire according to the present invention.

[FIG. 2A] A plan view showing an embodiment of the fiber conductor wire.

[FIG. 2B] A front view showing the embodiment of the fiber conductor wire.

[FIG. 2C] A perspective view showing an element wire of the fiber conductor wire.

DESCRIPTION OF EMBODIMENTS

An embodiment of a connecting structure and a connecting method of a fiber conductor wire according to the present invention is shown in FIGS. 1 to 5.

Figure 3A:
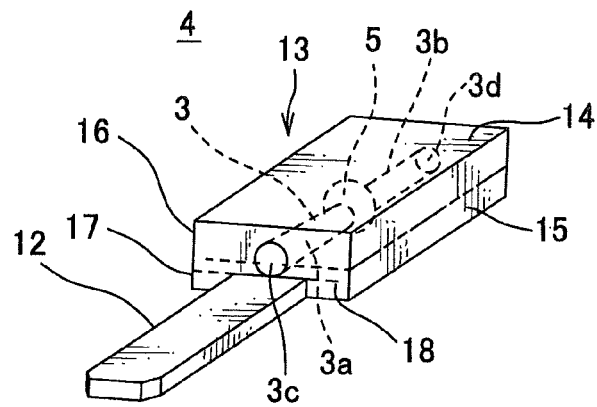
[FIG. 3A] A perspective view showing an embodiment of a terminal used in the connecting structure and the connecting method of the fiber conductor wire.
Figure 3B:
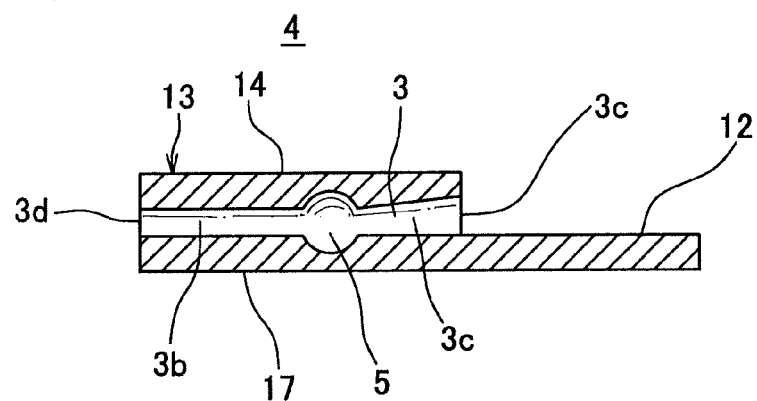
[FIG. 3B] A vertically sectional view showing the embodiment of the terminal used in the connecting structure and the connecting method of the fiber conductor wire.
Figure 4:
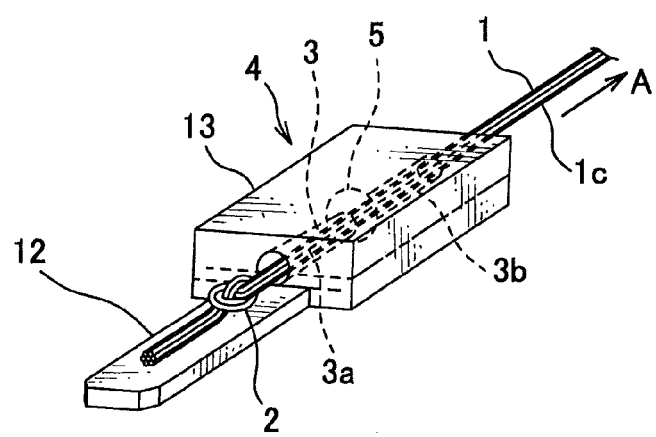
[FIG. 4] A perspective view showing a condition that a fiber conductor is inserted into a hole of the terminal.
Figure 5A:
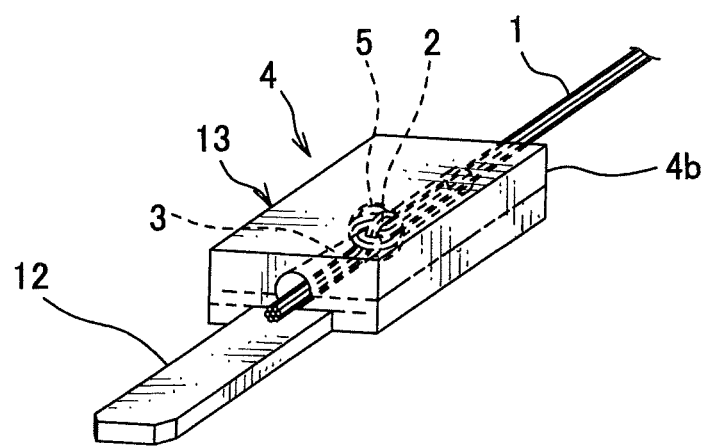
[FIG. 5A] A perspective view showing a condition that a knot of the fiber conductor is engaged with a receiving portion of the terminal.
Figure 5B:
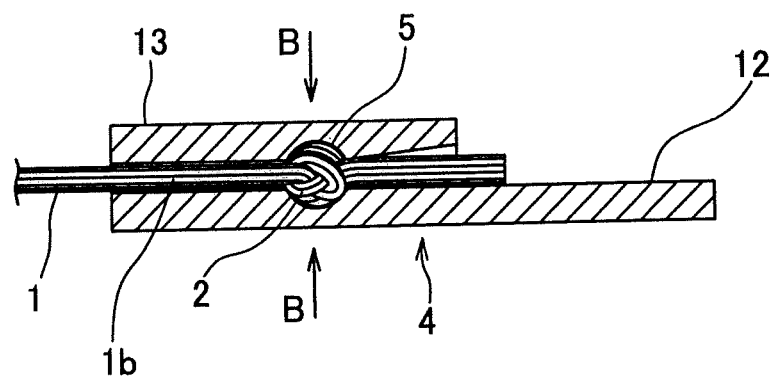
[FIG. 5B] A vertically sectional view showing the condition that the knot of the fiber conductor is engaged with the receiving portion of the terminal.

The connecting structure and the connecting method of the fiber conductor wire is composed of making a knot 2 in a fiber conductor 1 as shown in FIGS. 1A and 1B, using a terminal 4 having a hole 3 for inserting the fiber conductor as shown in FIGS. 3A and 3B, inserting the fiber conductor 1 into the hole 3 of the terminal 4 as shown in FIG. 4, pulling the fiber conductor 1, and locking and fixing the not 2 of the fiber conductor 1 in a receiving portion 5 in the middle of the hole 3 of the terminal 4 as shown in FIGS. 5A and 5B.

Hereinafter, the connecting structure and the connecting method of the fiber conductor wire will be explained in detail sequentially according to a process flow.

First, as shown in FIGS. 1A and 1B, a tip side of the fiber conductor 1 is loosely tied to form the knot 2. In FIG. 1B, the knot 2 is loosely tied in a temporarily tied state having a gap 6 therein.

The knot 2 of this embodiment is a half-hitch knot, however, various types of the knot 2 can be used corresponding to a size of the knot 2 such as a bowline knot or the like. These knots 2 are aimed for a single fiber conductor wire. For example, a square knot or the like can be used for tying two fiber conductor wires.

FIGS. 2A and 2B show an embodiment of the fiber conductor wire. As shown in FIGS. 2A and 2B, the fiber conductor wire 7 is composed of the fiber conductor 1 and an insulating resin cover 8 covering an outer periphery of the fiber conductor 1. As shown in FIG. 2C, the fiber conductor 1 is composed of a plurality of conductive element wire 11 made by forming a conductive metal plating layer 10 on an outer surface of a synthetic-resin-made extra fine fiber 9.

As the fiber 9, para-aramid, polyarylate, or the like are preferable. An outer diameter of the para-aramid fiber is about 12 μm Φ, and about 240 fibers 9 (element wires 11) compose a single fiber conductor 1. An outer diameter of the polyarylate fiber is about 22 μm Φ, and about 80 fibers 9 (element wires 11) compose a single fiber conductor 1. As a conductive metal plating layer 10, copper plating having about 2 to 3 μm thick is preferable.

As shown in FIGS. 3A and 3B, the terminal 4 of this embodiment integrally includes: a plate-shaped (tab-shaped) electric contact portion 12 at a front half; and a wire connecting portion 13 at a rear half. A hole 3 for inserting the fiber conductor penetrates in the center of the wire connecting portion 13 and extended in a longitudinal direction of the electric contact portion 12.

The hole 3 is composed of a hole portion 3a in the front half, a hole portion 3b in the rear half, and a receiving portion 5 in the middle. The receiving portion 5 is a substantially spherical shaped space (receiving chamber). A diameter of the receiving portion 5 is larger than those of the hole portions 2a, 3b. As shown in FIG. 3B, preferably, the hole portion 3a in the front half is formed in a tapered shape, and a diameter of the hole portion 3a is larger than that of the hole portion 3b in the rear half for inserting smoothly the knot 2 of the fiber conductor 1 into the receiving portion 5 and surely locking the knot 2 on the receiving portion 5.

In this case, a front opening 3c of the hole portion 3a in the front half is the largest, and a diameter is gradually reduced as the hole portion 3a extends backward to the receiving portion 5. A diameter of the hole portion 3b in the rear half is substantially the same as or less than a diameter of a rear end of the hole portion 3a in the front half. Preferably, an inner diameter of the hole portion 3b in the rear half is substantially the same as an outer diameter of the fiber conductor 1 for improving the locking force of the knot 2 (prevention from falling out backward). There is no need that the length of the hole portion 3a in the front half is the same as the length of the hole portion 3b in the rear half.

The hole 3 can be easily formed by, for example, forming a groove having a semicircular section on both upper and lower plates 14, 15 of the wire connecting portion 13. In this case, a groove having a semicircular section is formed on a lower wall of the upper plate 14 and an upper wall of the lower plate 15 by pressing, and by joining the upper and lower grooves, the hole 3 is formed. The two plates 14, 15 are connected to each other with a folding portion 16 at one side.

A tab-shaped electric contact portion 12 is integrally projected from a bottom half of the lower plate 15 (the lower plate 15 is thicker than the electric contact portion 12). Alternatively, a third plate 17 is formed at a bottom side of the lower plate 15. The second and the third plates 15, 17 from the top are connected to each other with a folding portion 18 at the other side. The tab-shaped electric contact portion 12 is integrally projected from the third plate 17 having the same thickness as the plate 17. The front opening 3c of the hole 3 is positioned at an upper side of a base end of the electric contact portion 12. The electric contact portion 12 is positioned at the center in a width direction of the wire connecting portion 13.

As shown in FIG. 4, the fiber conductor 1 is inserted into the hole 3, and the loosely tied knot 2 of the fiber conductor 1 is positioned at the top side of the electric contact portion 12. Then, as shown in an arrow A, the fiber conductor 1 is pulled backward. When the knot 2 is loosely tied, the knot 2 can contact an inner wall of the receiving portion 5 with a large contact area in FIG. 5. (When the knot 2 is tightly tied in FIG. 4, there is a fear that the contactivity may be decreased because a gap may be generated between the knot 2 and the inner wall of the receiving portion 5 in FIG. 5.)

From a condition shown in FIG. 4, the fiber conductor wire 7 including the fiber conductor 1, namely, the insulating resin cover 8 is pulled backward, thereby the loosely tied knot 2 is inserted into the hole portion 3a in the front half, and as shown in FIGS. 5A and 5B, the knot 2 is engaged in the receiving portion 5. An outer peripheral wall of the knot 2 is closely attached to an inner wall of the receiving portion 5 (contacts without gap), thereby a good electrical connection is attained. Further, the knot 2 is firmly locked in the receiving portion 5, thereby the knot 2 is prevented from falling out backward. A fiber conductor portion 1b at a back of the knot 2 contacts an inner wall of the hole portion 3b in the rear half almost without a gap, and an electrical connection is attained.

In FIG. 4, the insulating resin cover 8 is not shown. However, preferably, at least in a condition shown in FIG. 4, a fiber conductor portion 1c guided out backward is covered with the insulating resin cover 8 for insulating the fiber conductor portion 1c guided out backward from the terminal 4. In this case, in FIGS. 5A and 5B, a fiber conductor portion in a pulling length is exposed between a rear end 4b of the terminal 4 and a front end of the insulating resin cover 8. The exposed portion is isolated as necessary with an insulating tape or the like.

For saving this step, for example, the insulating resin cover 8 is formed thin in FIG. 2B. The front end of the insulating resin cover 8 is positioned close to the backside of the knot 2 in FIG. 1B (the knot is formed near the front end of the insulating resin cover 8). An outer diameter (maximum diameter) of the knot 2 is made larger than the outer diameter of the insulating resin cover 8 (as necessary, using a bowline knot or the like other than the half-hitch knot). An inner diameter of the hole 3 of the terminal 4 in FIG. 3 is made substantially the same as an outer diameter of the insulating resin cover 8. As shown in FIG. 4, the fiber conductor wire 7 is pulled backward to reduce the diameter of the knot 2 and to engage the knot 2 with the receiving portion 5 having the diameter larger than the hole 3 without a gap.

Thus, the insulating resin cover 8 is guided out from a rear end 3d (FIG. 3) of the hole 3, and the fiber conductor 1 is easily and surely insulated. As the insulating cover 8, thin enamel or the like can be used instead of resin.

In a case using the wire composed of only the fiber conductor 1 in FIG. 1, a case using the fiber conductor wire 7 having a thin insulating coat such as enamel, or a case using the fiber conductor wire 7 having a thick insulating cover 8 shown in FIG. 2, a rear end portion (not shown) of the fiber conductor portion 1c at the backside of the knot 2 is inserted backward (wire pulling direction) into the front opening 3c of the hole 3 of the terminal 4 from a condition shown in FIG. 1B.

When the tying process is done after the fiber conductor wire 7 is inserted into the terminal 4 not before the fiber conductor wire 7 is inserted into the terminal 4, a tip end (front end) 1a of the fiber conductor 1 having no knot 2 is inserted forward (opposite to wire pulling direction) into the rear opening 3d of the hole 3. Then, the tip end 1a of the fiber conductor 1 is tied as shown in FIG. 1B, and the fiber conductor 1 is pulled backward as shown in FIG. 4. In this case, even when the fiber conductor 1 has a thick insulating cover 8, an inner diameter of the hole 3 can be formed substantially the same as an outer diameter of the fiber conductor 1.

When the position of the receiving portion 5 is close to the front end of the wire connecting portion 13, an exposure length of the fiber conductor 1 from the front end 8a of the insulating resin cover 8 to the rear end 3d of the hole 3 can be reduced. When the inner diameter of the hole portion 3a in the front half is substantially the same as the outer diameter of the fiber conductor 1, and the inner diameter of the hole portion 3b in the rear half is substantially the same as the outer diameter of the insulating resin cover 8, the fiber conductor 1 is prevented from being exposed.

Further, though it takes some man-hours, it is possible that while the upper plate 15 in FIG. 3A is open and an inner wall of the hole 3 is exposed, the fiber conductor 1 is inserted into the hole 3 from the top (the knot 2 is positioned at the front of the hole as shown in FIG. 4), then the upper plate 14 is closed and the fiber conductor 1 is pulled in the arrow A direction in FIG. 4. Alternatively, it is also possible that while the upper plate 14 is open, the knot 2 is directly inserted into the receiving portion 5 and engaged with the receiving portion 5, then the upper plate 14 is closed.

In the other embodiment, in FIG. 5B, after the knot 2 is received in the receiving portion 5, bottom and top walls of the wire connecting portion 13 of the terminal 4, namely, the lower plate 17 and the upper plate 14 are pressed in a thickness direction as shown by an arrow B to increase the contactivity between an outer wall of the knot 2 and an inner wall of the receiving portion 5. In this case, the contactivity between an inner peripheral wall of the hole 3 and an outer peripheral wall of the fiber conductor 1 is also increased.

When the wire connecting portion 13 is composed of two plates 14, 15 (a lower thick plate and an upper thin plate), similarly, by pressing the upper and lower plates 14, 15, the contactivity between the outer wall of the knot 2 and the inner wall of the receiving portion 5 is increased. These pressing operations to the wire connecting portion 13 are preferably done by a press machine or the like.

Incidentally, in the embodiment described above, the terminal 4 having a male type electric contact portion 12 is used. However, a terminal (not shown) integrally having a female type electric contact portion formed in substantially a rectangular tube portion (having an elastic contact piece therein), an eyeglass shape, or the like, and the wire connecting portion 13 similar to those in FIGS. 3A and 3B extended from a rear side of the bottom wall of the electric contact portion can be used.

Further, in FIG. 3A, the wire connecting portion 13 is formed wide in a left and right direction. However, the wire connecting portion 13 can be formed narrow as same as the tab-shaped electric contact portion 12. In this case, when the terminal 4 is received in a not-shown insulating-resin-made connector housing, terminal receiving chambers (not shown) can be arranged in a fine pitch.

Further, the wire connecting portion 13 in FIG. 3A can be integrally formed with a conductive-metal-made bus bar (not shown) at a rear side of the bus bar instead of the terminal 4. In this case, the tab-shaped electric contact portion 12 is replaced with a long plate-shaped bus bar. Further, as the terminal 4, a joint terminal, a circular terminal, and the like having no electric contact portion 12 can be used.

Further, as the hole 3 of the terminal 4, it is possible that an inner diameter of the hole portion 3a in the front half is formed the same as an inner diameter of the receiving portion 5 (the hole portion 3a in the front half includes the receiving portion 5), and an inner diameter of the hole portion 3b in the rear half is formed smaller than the inner diameter of the hole portion 3a in the front half, and substantially the same as an outer diameter of the fiber conductor 1.

Further, in an embodiment shown in FIG. 2, as the fiber conductor 1, an outer peripheral wall of each fiber (element wire) 9 is plated with the metal plating layer 10. However, instead of the metal plating layer 10, a fiber conductor composed of a conductive material such as carbon or conductive metal powder included in synthetic resin can be used.

Further, in the embodiment described above, the knot 2 is tied at an end of one fiber conductor 1. However, for example, when using a joint terminal for branching, it is possible that the knot 2 is tied in the middle of the fiber conductor 1 in a longitudinal direction, and the knot 2 is inserted into and locked with the hole 3 (the receiving portion 5) of the terminal 4. In this case, one knot 2 can be formed by tying respective ends of two fiber conductors 1 with a flat knot or the like.

It is very difficult to tying a conductor composed of normal metallic element wires because of bad flexibility and because of many man-hours instead of the fiber conductor 1. Accordingly, there is little merit to use a conductor made of conductive metal instead of the fiber conductor 1 compared with a case of existing pressure bonding.

INDUSTRIAL APPLICABILITY

The connecting structure and the connecting method of the fiber conductor wire according to the present invention can be used to easily and surely connect an easily bendable fiber conductor to a terminal, a terminal portion of a bus bar, or the like.

REFERENCE SIGNS LIST 1 fiber conductor
2 knot
3 hole
4 terminal
5 receiving portion
7 fiber conductor wire

The invention claimed is:

1. A fiber conductor wire structure, comprising:
   a fiber conductor having a first portion with an outer insulating resin and a second portion with an outer conductive metal, the second portion defining a knot; and
   a terminal having a hole for inserting the fiber conductor, said hole having a receiving portion configured to receive the knot in locked engagement and electrical connection with the terminal.

2. The fiber conductor wire structure of claim 1, wherein the receiving portion is substantially spherical.

3. The fiber conductor wire structure of claim 1, wherein the hole includes cylindrical portions on opposite sides of the receiving portion, and the receiving portion has a larger diameter than the diameter of the cylindrical portions.

4. The fiber conductive wire structure of claim 1, wherein the hole includes a tapered portion with an enlarged inlet.

5. The fiber conductive wire structure of claim 1, wherein the terminal includes an upper plate and a lower plate facing the upper plate with each of the upper and lower plates defining a respective semi-circular groove, the semi-circular grooves in communication with one another to form the hole.

6. The fiber conductive wire structure of claim 5, wherein the outer conductive metal of the second portion defining the knot is in electrical contact with the upper and lower plates of the terminal in the respective grooves thereof.

7. The fiber conductive wire structure of claim 1, wherein the knot is loosely tied.

8. The fiber conductive wire structure of claim 1, wherein an outer diameter of the knot is larger than a diameter of the first portion with the outer insulating resin.

9. A connecting method for a fiber conductor wire, comprising:
   forming a knot with a portion of a fiber conductor having an outer conductive metal;
   inserting the fiber conductor into a hole of a terminal; and
   pulling the fiber conductor through the hole to engage the knot with a receiving portion of the terminal to place the knot in locked engagement and electrical connection with the terminal.

10. The connecting method of claim 9, further comprising:
    forcing the knot into the receiving portion via interference fit so as to closely maintain contact between the knot and the terminal.

11. The method of claim 9, wherein pulling the fiber conductor through the hole reduces a diameter of the knot.

12. The method of claim 9, wherein pulling the fiber conductor through the hole to engage the knot with a receiving portion causes a diameter of the knot to increase.

* * * * *